US012434409B2

(12) United States Patent
Taniguchi

(10) Patent No.: US 12,434,409 B2
(45) Date of Patent: Oct. 7, 2025

(54) RUBBER COMPOSITION MANUFACTURING METHOD, TIRE MANUFACTURING METHOD, AND RUBBER COMPOSITION MANUFACTURING APPARATUS

(71) Applicant: Toyo Tire Corporation, Itami (JP)

(72) Inventor: Sho Taniguchi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 112 days.

(21) Appl. No.: 18/072,807

(22) Filed: Dec. 1, 2022

(65) Prior Publication Data

US 2023/0202069 A1 Jun. 29, 2023

(30) Foreign Application Priority Data

Dec. 23, 2021 (JP) ................. 2021-208937

(51) Int. Cl.
| | |
|---|---|
| B29B 7/76 | (2006.01) |
| B29B 7/00 | (2006.01) |
| B29K 507/04 | (2006.01) |
| B29L 30/00 | (2006.01) |

(52) U.S. Cl.
CPC ............ B29B 7/002 (2013.01); B29B 7/7621 (2013.01); B29B 7/7647 (2013.01); B29B 7/7663 (2013.01); B29K 2507/04 (2013.01); B29L 2030/00 (2013.01)

(58) Field of Classification Search
CPC ....... B29B 7/002; B29B 7/7663; B29B 7/246; B29B 7/72
See application file for complete search history.

(56) References Cited

U.S. PATENT DOCUMENTS

| | | |
|---|---|---|
| 3,095,126 A | 6/1963 | Willshaw |
| 5,865,535 A | 2/1999 | Edwards |
| 2013/0018141 A1* | 1/2013 | Oda ..................... B29B 7/283 |
| | | 366/100 |

FOREIGN PATENT DOCUMENTS

| | | |
|---|---|---|
| JP | H11-57445 A | 3/1999 |
| JP | 2018-123193 A | 8/2018 |
| JP | 2019-112525 A | 7/2019 |
| JP | 2021-102721 A | 7/2021 |
| JP | 2022-001626 A | 1/2022 |
| KR | 100482620 B1 | 9/2005 |

OTHER PUBLICATIONS

JP2018123193 machine translation (Year: 2018).*
Extended (Supplementary)European Search Report dated May 11, 2023, issued in counterpart EP Application No. 22212079.2. (7 pages).
Office Action dated Jun. 13, 2025 issued in counterpart JP application No. 2021-208937 with English translation. (9 pages).

* cited by examiner

Primary Examiner — Alison L Hindenlang
Assistant Examiner — Alexander A Wang
(74) Attorney, Agent, or Firm — WHDA, LLP

(57) ABSTRACT

A rubber composition manufacturing method comprises an operation in which at least rubber, silica, and silane coupling agent are kneaded in an internal kneader at not less than a temperature lower limit for a coupling reaction between the silica and the silane coupling agent to proceed. For at least a portion of time during which that operation is being carried out, a compressed gas is delivered to the kneading chamber while the ram is in a nonpressing state.

20 Claims, 1 Drawing Sheet

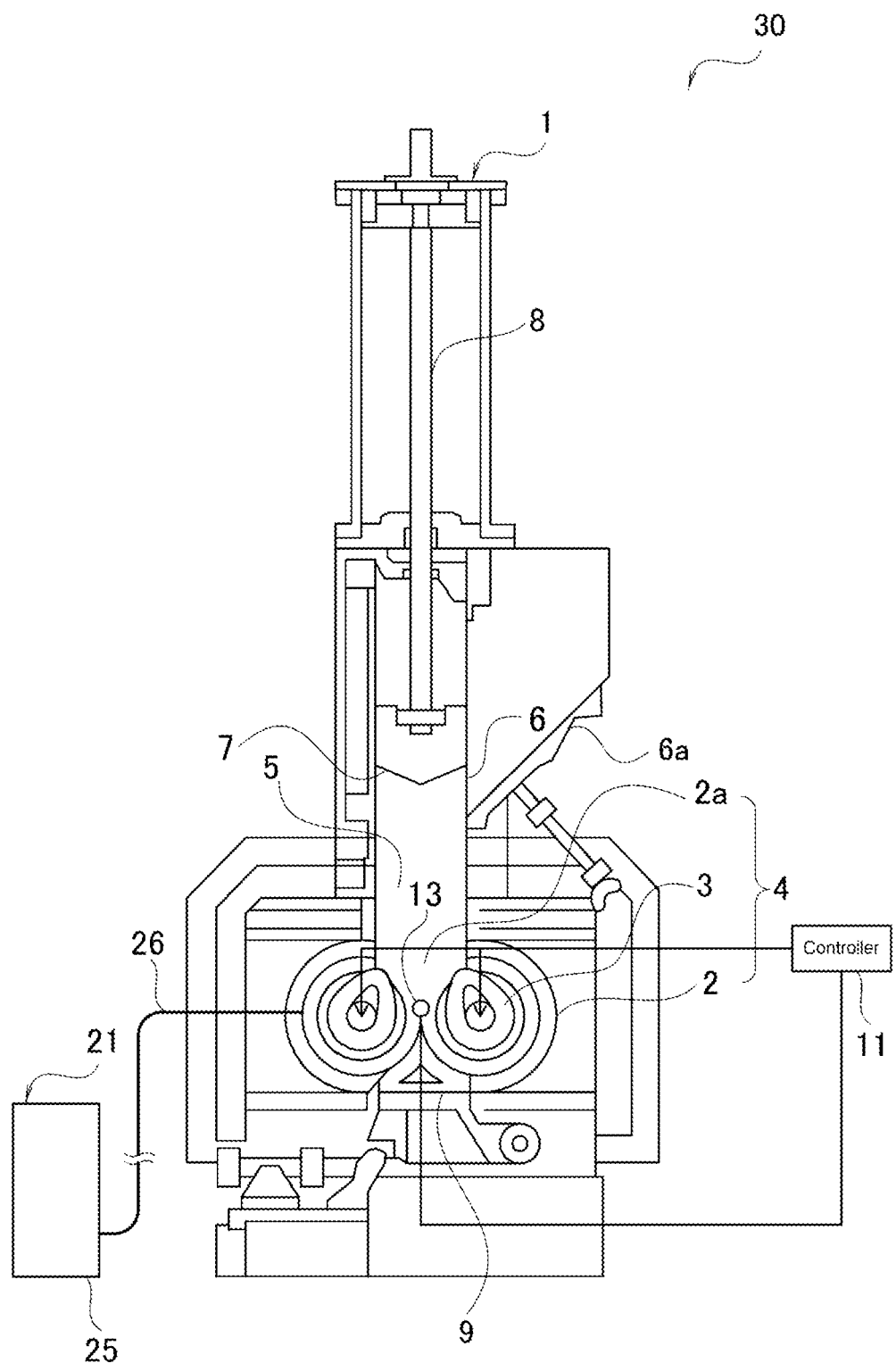

RUBBER COMPOSITION MANUFACTURING METHOD, TIRE MANUFACTURING METHOD, AND RUBBER COMPOSITION MANUFACTURING APPARATUS

TECHNICAL FIELD

The present invention relates to a rubber composition manufacturing method, a tire manufacturing method, and a rubber composition manufacturing apparatus.

BACKGROUND ART

Because silica which is employed as reinforcing filler in rubber possesses silanol groups, there is a tendency for flocculation to occur due to hydrogen bonding. It is therefore the case that silica cannot easily be satisfactorily dispersed. In particular, silica cannot easily be satisfactorily dispersed in situations such as when silica filler content is high, silica particle diameter is small, and so forth.

To decrease silica cohesive forces, use of silane coupling agent is known. Silane coupling agents can prevent flocculation of silica because they are capable of reacting with silica during kneading. Moreover, silane coupling agents can cause bonding of silica and rubber because they are capable of reacting with rubber double bonds during vulcanization, for example.

As a technique for reducing silica cohesive forces, Patent Reference No. 1 describes causing kneading to be carried out while the ram is raised while controlling kneading temperature so as to be not less than a temperature lower limit for a coupling reaction between silica and silane coupling agent to proceed.

PRIOR ART REFERENCES

Patent References

Patent Reference No. 1: Japanese Patent Application Publication Kokai No. 2021-102721

SUMMARY OF INVENTION

Problem to be Solved by Invention

While the method described at Patent Reference No. 1 reduces silica cohesive forces (which is to say that it increases dispersion of silica) and consequently permits improvement in performance with respect to braking on wet road surfaces (hereinafter "wet braking performance") and in ability to achieve reduced heat generation in tires, this method still leaves room for improvement.

It is an object of the present invention to provide a tire manufacturing method and a method for manufacturing a rubber composition permitting improvement in wear resistance, wet braking performance, and ability to achieve reduced heat generation in tires. It is also an object of the present invention to provide an apparatus for manufacturing such a rubber composition.

Means for Solving Problem

To solve such problems, a rubber composition manufacturing method in accordance with the present invention comprises an operation in which at least rubber, silica, and silane coupling agent are kneaded in an internal kneader at not less than a temperature lower limit for a coupling reaction between the silica and the silane coupling agent to proceed, wherein the internal kneader comprises a kneading chamber, a neck which is located above the kneading chamber, and a ram which is capable of moving vertically through a space within the neck; and for at least a portion of time during which the operation is being carried out, a compressed gas is delivered to the kneading chamber while the ram is in a nonpressing state.

Where it is said here that "the ram is in a nonpressing state," this means a state in which the ram is raised, and in which the kneading chamber constitutes an open system.

By performing a rubber composition manufacturing method in accordance with the present invention, due to the fact that kneading is carried out at not less than the temperature lower limit for the coupling reaction to proceed, because it is possible to cause silane coupling agent to become affixed to silica, it is possible to reduce silica cohesive forces.

Moreover, by causing kneading to be carried out while the ram is in a state in which it is not pressing thereon (hereinafter also referred to as "a nonpressing state") for at least a portion of the time during which kneading is being carried out at not less than the temperature lower limit for the coupling reaction to proceed, because it will be possible to cause volatile substances (e.g., water and/or alcohol) generated during the course of the coupling reaction to be discharged to the exterior of the kneading chamber, it will be possible for the coupling reaction to be made to proceed with good efficiency, and it will be possible to further reduce silica cohesive forces. In other words, it will be possible to further increase the degree to which silica is dispersed.

What is more, by causing compressed gas to be delivered to the kneading chamber while this is in a nonpressing state, because it will be possible to cause volatile substances (e.g., water and/or alcohol) to be effectively discharged to the exterior of the kneading chamber, it will be possible to even further improve the efficiency with which the coupling reaction is made to proceed, and it will be possible to even further reduce silica cohesive forces. In other words, it will be possible to even further increase the degree to which silica is dispersed.

As a result, it will be possible to improve wear resistance, wet braking performance, and ability to achieve reduced heat generation in tires.

It is preferred that the constitution be such that the internal kneader comprises a rotor at the kneading chamber; and for the at least the portion of the time, rotational speed of the rotor is controlled by means of PID control to cause kneading temperature to be a target temperature.

If a nonpressing state were made to exist with no PID control of the rotor being carried out whatsoever (i.e., if a nonpressing state were made to exist while the rotational speed of the rotor was held constant), it is conceivable that a given blended mixture might result in a situation in which the kneading temperature is reduced to a temperature below the temperature lower limit for the coupling reaction to proceed, and that another given blended mixture might result in a situation in which the kneading temperature is made to increase to a temperature not less than the temperature at which gel formation occurs.

To address this, by controlling the rotational speed of the rotor by means of PID control, because it is possible to stabilize the kneading temperature, this makes it possible to suppress occurrence of gel formation and % or reduction in the degree to which the coupling reaction takes place.

It is preferred that the constitution be such that the at least the portion of the time is not less than 5 seconds.

Such constitution will make it possible to cause volatile substances (e.g., water and/or alcohol) generated during the course of the coupling reaction to be even more effectively discharged to the exterior of the kneading chamber. It will therefore be possible to even further improve wear resistance, wet braking performance, and ability to achieve reduced heat generation in tires.

It is preferred that the constitution be such that the internal kneader further comprises a hole constituting an opening in a wall face of the kneading chamber; and for the at least the portion of the time, the compressed gas is delivered to the kneading chamber by way of the hole.

It is preferred that the constitution be such that the compressed gas is compressed air. The reason for this is that because compressed air can be generated at low cost, this will make it possible to reduce cost.

A tire manufacturing method in accordance with the present invention comprises an operation in which the rubber composition manufacturing method is used to prepare the rubber composition; and an operation in which the rubber composition is used to fabricate an unvulcanized tire.

A rubber composition manufacturing apparatus in accordance with the present invention comprises an internal kneader comprising a kneading chamber, a neck which is located above the kneading chamber, a ram which is capable of moving vertically through a space within the neck, and a hole constituting an opening in a wall face of the kneading chamber; and a compressor that generates compressed gas for delivery to the kneading chamber by way of the hole.

In accordance with the rubber composition manufacturing apparatus of the present invention, because it is possible to cause a compressed gas generated by a compressor to be delivered thereto by way of at least one hole constituting an opening in a wall face of a kneading chamber, by causing the compressed gas to be delivered to the kneading chamber while this is in a nonpressing state, for example, it is possible to cause volatile substances (e.g., water and/or alcohol) generated during the course of the coupling reaction to be discharged to the exterior of the kneading chamber. As a result, it will be possible for the coupling reaction to be made to proceed with good efficiency, and it will be possible to reduce silica cohesive forces. In other words, it will be possible to increase the degree to which silica is dispersed. It will therefore be possible to further improve wear resistance, wet braking performance, and ability to achieve reduced heat generation in tires.

BRIEF DESCRIPTION OF DRAWINGS

FIG. 1 Conceptual diagram showing constitution of rubber composition manufacturing apparatus in accordance with the present embodiment.

EMBODIMENTS FOR CARRYING OUT INVENTION

Below, description is given with respect to embodiments of the present invention.

1. Rubber Composition Manufacturing Apparatus

Description will first be given with respect to a rubber composition manufacturing apparatus, i.e., kneading system, capable of being used in accordance with the present embodiment.

As shown in FIG. 1, rubber composition manufacturing apparatus 30 in accordance with the present embodiment comprises internal kneader 1, and compressor 21 which generates compressed gas for delivery to internal kneader 1. Manufacturing apparatus 30 further comprises plumbing 26 which is for the compressed gas and which is secured to internal kneader 1. Regarding the path taken by the compressed gas, manufacturing apparatus 30 may comprise other equipment, e.g., aftercooler(s), tank(s), mainlife filter(s), and/or air dryer(s), between compressor 21 and plumbing 26. Manufacturing apparatus 30 may, of course, comprise plumbing for connection thereof.

Compressor 21 may be capable of generating compressed gas. Compressor 21 comprises housing 25. Within housing 25, compressor 21 might, for example, comprise a motor (not shown); a compressor proper (not shown) which is driven by the motor and which compresses a gas (e.g., air); and a tank (not shown) which stores the compressed gas that is produced as a result of compression by the compressor proper. At such a compressor 21, compressed gas expelled from the compressor proper may flow into the tank by way of plumbing (not shown). On the other hand, compressed gas stored in the tank might be directed to the exterior of compressor 21 by way of plumbing (not shown). Note that compressor 21 might, for example, further comprise aftercooler(s), tank(s), mainlife filter(s), and/or air dryer(s).

As the compressed gas, compressed air and compressed inert gases (e.g., nitrogen gas, helium gas, neon gas, and argon gas) may be cited as examples. Of these, because it can be generated at low cost, compressed air is preferred.

Compressed gas directed to the exterior of compressor 21 might, as necessary, be routed through aftercooler(s), tank(s), mainlife filter(s), and/or air dryer(s), and be routed through plumbing 26, to be delivered to kneading chamber 4 of internal kneader 1. Note that plumbing 26 is provided with a pressure gauge (not shown) for measuring the pressure of the compressed gas.

Internal kneader 1 comprises kneading chamber 4 which has casing 2 and rotor 3; cylindrical neck 5 which is located above kneading chamber 4; inlet port 6 which is provided at neck 5; hopper door 6a which is capable of opening and closing inlet port 6; ram 7 which is capable of moving vertically in the space within neck 5; and drop door 9 which is located at the bottom face of kneading chamber 4. As internal kneader 1, intermeshing internal kneaders, tangential internal kneaders, and the like may be cited as examples.

Opening 2a is provided in a central region at the top face of casing 2. Cylindrical neck 5 is provided above opening 2a. Inlet port 6, by way of which rubber and compounding ingredients can be fed thereinto, is provided at the side face of neck 5. Two or more inlet ports 6 may be provided. Rubber and compounding ingredients fed thereinto from inlet port 6 pass through the cylindrical space at neck 5 and are fed into the interior of casing 2 by way of opening 2a of casing 2.

Ram 7 is of such shape as to be capable of closing off opening 2a of casing 2. By virtue of shaft 8 which is connected thereto at the top end thereof, ram 7 is made capable of moving vertically within the space of neck 5. Under the force of its own weight and/or as a result of a pressing force that acts thereon from shaft 8, ram 7 is able to press on and compress rubber that is present within casing 2.

Drop door 9 is closed during kneading. Drop door 9 opens following termination of kneading.

The rotational speed of a motor (not shown) which causes rotor 3 to rotate is adjusted based on control signals from controller 11. Controller 11 carries out control of the rotational speed of the motor based on information (more specifically, measured temperature Tp) regarding the temperature within kneading chamber 4 which is sent thereto from temperature sensor 13. The motor can be made to be of variable rotational speed by virtue of controller 11. The motor might, for example, be an inverter-duty motor.

To determine the rotational speed of the motor, a PID arithmetic unit provided within controller 11 carries out proportional (P), integral (I), and differential (D) arithmetic operations based on the deviation between target temperature Ts and temperature Tp measured within kneading chamber 4 as detected by temperature sensor 13. More specifically, the PID arithmetic unit determines motor rotational speed from the sum of respective control quantities obtained as a result of proportional (P) action by which a control quantity is calculated in proportion to the difference (deviation e) between measured temperature Tp and target temperature Ts, integral (I) action by which a control quantity is calculated from an integral obtained by integrating the deviation e over time, and differential (D) action by which a control quantity is calculated from the slope of the change in, i.e., the derivative of, deviation e. Note that PID is an abbreviation for Proportional Integral Differential.

Internal kneader 1 further comprises a hole constituting an opening in a wall face of kneading chamber 4. In other words, casing 2 of internal kneader 1 comprises a hole that constitutes an opening which is directed toward kneading chamber 4. This hole passes all the way therethrough from the outer face of casing 2 to the inner face thereof. Compressed gas generated by compressor 21 is delivered to kneading chamber 4 by way of this hole.

2. Rubber Composition Manufacturing Method

Methods for manufacturing rubber compositions in accordance with the present embodiment will now be described.

A method for manufacturing a rubber composition in accordance with the present embodiment comprises an operation (hereinafter "Operation S1") in which a rubber mixture is prepared; and an operation (hereinafter "Operation S2") in which at least the rubber mixture and a vulcanizing-type compounding ingredient are kneaded to obtain a rubber composition.

2.1 Operation S1 (Operation in which Rubber Mixture is Prepared)

Operation S1 comprises an operation (hereinafter "Operation K1") in which at least rubber, silica, and silane coupling agent are kneaded at internal kneader 1 while the kneading temperature is controlled so as to be below the temperature lower limit for a coupling reaction (i.e., a reaction between silica and silane coupling agent) to proceed; an operation (hereinafter "Operation K2") in which kneading is carried out at internal kneader 1 while the kneading temperature is increased, and an operation (hereinafter "Operation K3") in which kneading is carried out at internal kneader 1 while the kneading temperature is controlled so as to be not less than the temperature lower limit for the coupling reaction to proceed.

Stating this another way, Operation S1 comprises an operation (i.e., Operation K1) in which at least rubber, silica, and silane coupling agent are kneaded at internal kneader 1 while the kneading temperature is controlled so as to suppress a coupling reaction; an operation (i.e., Operation K2) in which kneading is carried out at internal kneader 1 while the kneading temperature is increased; and an operation (i.e., Operation K3) in which kneading is carried out at internal kneader 1 while the kneading temperature is controlled so as to cause the coupling reaction to proceed.

Operations K1 through K3 constitute a single kneading stage. A kneading stage is the cycle that takes place from the time that material(s) are fed into internal kneader 1 until the time that discharge occurs therefrom. Materials in the form of rubber, silica, and silane coupling agent therefore remain undischarged from internal kneader 1 at the time of the transition from Operation K1 to Operation K2, and the materials likewise remain undischarged from internal kneader 1 at the time of the transition from Operation K2 to Operation K3.

2.1.1. Operation K1 (Operation in which Kneading is Carried Out while Temperature is Controlled so as to be Below Temperature Lower Limit for Coupling Reaction to Proceed)

At Operation K1, at least rubber, silica, and silane coupling agent are fed into internal kneader 1, and at least rubber, silica, and silane coupling agent are kneaded while the kneading temperature is controlled so as to be below the temperature lower limit for a coupling reaction to proceed. That is, at Operation K1, at least rubber, silica, and silane coupling agent are fed into internal kneader 1, and these are kneaded while the kneading temperature is controlled so as to suppress the coupling reaction. By carrying out Operation K1, it is possible to achieve effective dispersal of silica before the coupling reaction reaches the point where it is proceeding vigorously. In addition, presence of Operation K1 also makes it possible to reduce the amount of electric power that must be consumed to manufacture the rubber composition. Description will be given with respect to this. Were the kneading temperature not controlled at Operation K1, then because kneading time would be limited due to the increase in temperature which would occur as a result of the heat generated from shearing, there would be great need to carry out rekneading multiple times (and such need would be all the more great where a high silica filler content is to be blended therein). In contradistinction thereto, because by controlling kneading temperature at Operation K1 the present embodiment makes it possible to eliminate limits on kneading time that would otherwise be imposed due to increase in temperature, it is possible to increase kneading time, and it is accordingly possible to reduce the number of times that rekneading must be carried out. As a result, it is possible to reduce the amount of electric power that must be consumed to manufacture the rubber composition. Moreover, at Operation K1, it is possible for kneading to occur while in a state in which material that is in the process of being kneaded is pressed on by ram 7, i.e., while this is in a pressing state. For at least a portion of the time during which Operation K1 is being carried out, kneading may be carried out while ram 7 is in a nonpressing state.

As the rubber, natural rubber, polyisoprene rubber, styrene-butadiene rubber (SBR), polybutadiene rubber (BR), nitrile rubber, chloroprene rubber, and so forth may be cited as examples. One or any desired combination may be chosen from thereamong and used. It is preferred that the rubber be diene rubber.

A modified rubber may be used as the rubber. As modified rubber, modified SBR and modified BR may be cited as examples. The modified rubber may possess functional group(s) that contain heteroatom(s). While functional group(s) may be introduced at end(s) of polymer chain(s) or in mid-chain, it is preferred that they be introduced at end(s) thereof. As functional group(s), amino groups, alkoxyl groups, hydroxyl groups, carboxyl groups, epoxy groups, cyano groups, halogen atoms, and so forth may be cited as examples. Of these, amino groups, alkoxyl groups, hydroxyl groups, and carboxyl groups are preferred. The modified rubber may possess at least one of the types of functional groups that were cited as examples. As amino group(s), primary amino groups, secondary amino groups, tertiary amino groups, and so forth may be cited as examples. As alkoxyl group(s), methoxy groups, ethoxy groups, propoxy groups, butoxy groups, and so forth may be cited as examples. The functional groups that were cited as examples interact with silanol groups (Si—OH) of silica. Here, "interaction" means, for example, that there is formation of a hydrogen bond or a chemical bond caused by chemical reaction with a silanol group of silica. The amount of modified rubber might be not less than 10 mass %, might be not less than 20 mass %, or might be not less than 30 mass %, per 100 mass % of the rubber used at Operation K1. The amount of modified rubber might be not greater than 90 mass %, might be not greater than 80 mass %, or might be not greater than 70 mass %, per 100 mass % of the rubber used at Operation K1.

As silica, wet silica and dry silica may be cited as examples. Of these, wet silica is preferred. As wet silica, precipitated silica may be cited as example. Specific surface area of silica as determined by nitrogen adsorption might be not less than 80 m$^2$/g, or it might be not less than 120 m$^2$/g, or it might be not less than 140 m$^2$/g, or it might be not less than 160 m$^2$/g, for example. Specific surface area of silica might be not greater than 300 m$^2$/g, or it might be not greater than 280 m$^2$/g, or it might be not greater than 260 m$^2$/g, or it might be not greater than 250 m$^2$/g, for example. Here, the specific surface area of silica is measured in accordance with the multipoint nitrogen adsorption method (BET method) described at JIS K-6430.

It is preferred at Operation K1 that the amount of silica be not less than 10 parts by mass, more preferred that this be not less than 30 parts by mass, still more preferred that this be not less than 50 parts by mass, still more preferred that this be not less than 70 parts by mass, and still more preferred that this be not less than 80 parts by mass, per 100 parts by mass of rubber. It is preferred that the amount of silica be not greater than 150 parts by mass, more preferred that this be not greater than 140 parts by mass, still more preferred that this be not greater than 130 parts by mass, and still more preferred that this be not greater than 120 parts by mass, per 100 parts by mass of rubber.

As silane coupling agent, bis(3-triethoxysilylpropyl)tetrasulfide, bis(3-triethoxysilylpropyl)disulfide, bis(2-triethoxysilylethyl)tetrasulfide, bis(4-triekitoshisilylbutyl)disulfide, bis(3-timethoxysilylpropyl)tetrasulfide, bis(2-trimethoxysilylethyl)disulfide, and other such sulfide silanes, γ-mercaptopropyltrimethoxysilane, γ-mercaptopropyltriethoxysilane, mercaptopropyhmethyldimethoxysilane, mercaptopropyldimethylmethoxysilane, mercaptoethyltriethoxysilane, and other such mercaptosilanes, 3-octanoylthio-1-propyltriethoxysilane, 3-propionylthiopropyltrimethoxysilane, and other such protected mercaptosilanes may be cited as examples. One or any desired combination may be chosen from thereamong and used.

At Operation K1, it is preferred that the amount of silane coupling agent be not less than 1 part by mass, more preferred that this be not less than 3 parts by mass, and still more preferred that this be not less than 5 parts by mass, per 100 parts by mass of silica. The upper limit of the range in values for the amount of silane coupling agent might be 20 parts by mass, or might be 15 parts by mass, per 100 parts by mass of silica, for example.

At Operation K1, carbon black, antioxidant, stearic acid, wax, zinc oxide, oil, and/or the like may be kneaded together with the rubber, silica, and silane coupling agent. One or any desired combination may be chosen from thereamong and used.

As examples of carbon black, besides SAF, ISAF, HAF, FEF, GPF, and/or other such furnace blacks, acetylene black, Ketchen black, and/or other such electrically conductive carbon blacks may be used. The carbon black may be nongranulated carbon black or may be granulated carbon black that has been granulated based upon considerations related to the handling characteristics thereof. Any one thereamong may be used, or any two or more thereamong may be used.

As antioxidant, aromatic-amine-type antioxidant, amine-ketone-type antioxidant, monophenol-type antioxidant, bisphenol-type antioxidant, polyphenol-type antioxidant, dithiocarbamate-type antioxidant, thiourea-type antioxidant, and the like may be cited as examples. One or any desired combination may be chosen from thereamong and used as the antioxidant.

At Operation K1, kneading is carried out so as to cause the kneading temperature to be held constant. More specifically, at Operation K1, kneading is carried out so as to cause measured temperature Tp to be maintained at target temperature Ts. At such time, measured temperature Tp may be maintained so as to be within 5° C. of target temperature Ts. Target temperature Ts might be less than 140° C., or might be not greater than 138° C., or might be not greater than 135° C., or might be not greater than 132° C., or might be not greater than 130° C. It is preferred that target temperature Ts be not less than 100° C., more preferred that this be not less than 110° C. still more preferred that this be not less than 115°, and still more preferred that this be not less than 120°. Where this is too low, there is a tendency for it to take a long time for silica to be dispersed. Note that target temperature Ts may be chosen as appropriate in light of the blend employed, and especially in light of the type(s) of silane coupling agent(s) employed.

At Operation K1, kneading might be carried out so as to cause the kneading temperature to be maintained within a constant range for not less than 10 seconds, for example. That is, kneading temperature might be controlled for not less than 10 seconds. It is preferred that this be not less than 20 seconds, and preferred that this be not less than 30 seconds. This might be not less than 40 seconds, or this might be not less than 60 seconds, or this might be not less than 70 seconds. This might be not greater than 1000 seconds, or this might be not greater than 800 seconds, or this might be not greater than 600 seconds, or this might be not greater than 400 seconds, or this might be not greater than 200 seconds, or this might be not greater than 100 seconds.

The kneading temperature might be maintained by carrying out adjustment of the rotational speed of rotor 3. More specifically, the kneading temperature might be maintained by virtue of the fact that the rotational speed of rotor 3 is adjusted by means of PID control. Here, the rotational speed of rotor 3 might be adjusted by means of PID control so as to cause measured temperature Tp to be target temperature Ts. PID control may commence at the start of kneading, or may commence when measured temperature Tp reaches some prescribed temperature (e.g., target temperature Ts, or a temperature somewhat lower than target temperature Ts).

2.1.2. Operation K2 (Operation in which Kneading is Carried Out as Kneading Temperature is Increased)

At Operation K2, kneading is carried out while the kneading temperature is increased. At Operation K2, the kneading temperature may be increased to a temperature on the order of that at which the coupling reaction proceeds vigorously (e.g., 140° C. or higher). For example, the kneading temperature might be increased to the target temperature Ts for Operation K3, or might be increased to a temperature that is somewhat lower than the target temperature Ts. Moreover, at Operation K2, kneading might be made to occur while in a state in which material that is in the process of being kneaded is pressed on by ram 7; i.e., while this is in a pressing state.

2.1.3. Operation K3 (Operation in which Kneading is Carried Out while Temperature is Controlled so as to be not Less than Temperature Lower Limit for Coupling Reaction to Proceed)

At Operation K3, kneading is carried out at internal kneader 1 while kneading temperature is controlled so as to be not less than the temperature lower limit for the coupling reaction to proceed. That is, at Operation K3, kneading is carried out while kneading temperature is controlled so as to cause the coupling reaction to proceed. By carrying out Operation K3, due to the fact that kneading is carried out at not less than the temperature lower limit for the coupling reaction to proceed, because it is possible to cause silane coupling agent to become affixed to silica, it is possible to reduce silica cohesive forces. In addition, by carrying out Operation K3, because kneading temperature is controlled, it is possible to reduce the amount of electric power that must be consumed to manufacture the rubber composition. Description will be given with respect to this. Were the kneading temperature not controlled at Operation K3, then because kneading time would be limited due to the increase in temperature which would occur as a result of the heat generated from shearing, there would be great need to carry out rekneading multiple times (and such need would be all the more great where a high silica filler content is to be blended therein). In contradistinction thereto, because by controlling kneading temperature at Operation K3 the present embodiment makes it possible to eliminate limits on kneading time that would otherwise be imposed due to increase in temperature, it is possible to increase kneading time, and it is accordingly possible to reduce the number of times that rekneading must be carried out. As a result, it is possible to reduce the amount of electric power that must be consumed to manufacture the rubber composition.

At Operation K3, kneading is carried out so as to cause the kneading temperature to be held constant. More specifically, at Operation K3, kneading is carried out so as to cause measured temperature Tp to be maintained at target temperature Ts. At such time, measured temperature Tp may be maintained so as to be within 5° C. of target temperature Ts. Target temperature Ts might be not less than 140° C., or might be not less than 142° C., or might be not less than 145° C., or might be not less than 148° C., or might be not less than 150° C. Where this is too low, there is a tendency for it to take too long a time for the coupling reaction to proceed. It is preferred that target temperature Ts be not greater than 170° C. more preferred that this be not greater than 165° C., still more preferred that this be not greater than 160°, still more preferred that this be not greater than 155°, and still more preferred that this be not greater than 153°. Where this is too high, it is sometimes the case that there will be gel formation.

At Operation K3, kneading might be carried out so as to cause the kneading temperature to be maintained within a constant range for not less than 20 seconds, for example. That is, kneading temperature might be controlled for not less than 20 seconds. It is preferred that this be not less than 40 seconds, more preferred that this be not less than 60 seconds, still more preferred that this be not less than 80 seconds, and still more preferred that this be not less than 100 seconds. This might be not greater than 1500 seconds, or this might be not greater than 1000 seconds, or this might be not greater than 500 seconds, or this might be not greater than 300 seconds, or this might be not greater than 200 seconds.

Note that, as was the case at Operation K1, the kneading temperature is maintained by carrying out adjustment of the rotational speed of rotor 3.

For at least a portion of the time during which Operation K3 is being carried out, compressed gas is delivered to kneading chamber 4 while ram 7 is in a nonpressing state. That is, kneading is carried out while kneading temperature is controlled so as to be not less than the temperature lower limit for the coupling reaction to proceed as compressed gas is being delivered to kneading chamber 4 while ram 7 is in a nonpressing state (i.e., a state in which it is not pressing thereon). Hereinbelow, the state in which ram 7 is in a nonpressing state and in which compressed gas is being delivered to kneading chamber 4 is sometimes referred to as a "volatile substance discharge state". By causing kneading to be carried out while in a volatile substance discharge state, because it will be possible to cause volatile substances (e.g., water and/or alcohol) to be effectively discharged to the exterior of kneading chamber 4, it will be possible to even further improve the efficiency with which the coupling reaction is made to proceed, and it will be possible to even further reduce silica cohesive forces.

When ram 7 is in a nonpressing state (i.e., a state in which it is not pressing thereon), ram 7 is raised, and kneading chamber 4 constitutes an open system. This state might, for example, be created by opening hopper door 6a, and while in this state causing ram 7 to be raised at least to such an extent as will permit gas within kneading chamber 4 to be expelled to the exterior of internal kneader 1 by way of inlet port 6. As a result, it will be possible to cause volatile substances (e.g., water and/or alcohol) to be effectively discharged to the exterior of kneading chamber 4. At such time, hopper door 6a might be completely open, or it might be halfway open, for example.

The state in which ram 7 is in a nonpressing state and in which compressed gas is being delivered to kneading chamber 4 (i.e., the volatile substance discharge state) may be sustained, i.e., continuous, or it may be discontinuous. A discontinuous volatile substance discharge state might be created, for example, by causing compressed gas to be discontinuously (e.g., intermittently) delivered to kneading chamber 4 while ram 7 is maintained in a nonpressing state. Thereamong, volatile substance discharge states that are sustained, i.e., continuous, are preferred.

Kneading while in volatile substance discharge state(s) may be carried out all throughout Operation K3 (i.e., for all of the time during which Operation K3 is being carried out), or it may be carried out for only a portion of the time during which Operation K3 is being carried out. Where kneading while in a volatile substance discharge state is carried out from a time partway through Operation K3, kneading while in the volatile substance discharge state might be made to begin after not less than 10 seconds has elapsed following the start of Operation K3 (i.e., the start of the period during which kneading is carried out while kneading temperature is controlled so as to be not less than the temperature lower limit for the coupling reaction to proceed), or might be made to begin after not less than 20 seconds has elapsed thereafter, or might be made to begin after not less than 30 seconds has elapsed thereafter, for example.

It is preferred that the time during which the volatile substance discharge state exists be not less than 5 seconds, more preferred that this be not less than 10 seconds, still more preferred that this be not less than 20 seconds, and still more preferred that this be not less than 30 seconds. When this is not less than 5 seconds, it will be possible to cause volatile substances (e.g., water and/or alcohol) generated during the course of the coupling reaction to be even more effectively discharged to the exterior of kneading chamber 4. Note that where the volatile substance discharge state is discontinuous. "the time during which the volatile substance discharge state exists" means the total time occupied by volatile substance discharge states.

Pressure of the compressed gas delivered to kneading chamber 4 while in volatile substance discharge state(s) might be not less than 0.2 MPa, or might be not less than 0.3 MPa, or might be not less than 0.4 MPa. When this is not less than 0.2 MPa, it will be possible to cause volatile substances (e.g., water and/or alcohol) generated during the course of the coupling reaction to be even more effectively discharged to the exterior of kneading chamber 4. Note that "pressure of the compressed gas" may be taken to be the pressure of the compressed gas within plumbing 26. This pressure might be measured by means of a pressure gauge provided at plumbing 26.

The amount of compressed gas which is expelled therefrom (specifically, the amount of compressed gas expelled from compressor 21) might be not less than 300 L/min, or might be not less than 700 L/min, for example. On the other hand, the amount expelled therefrom might be not greater than 1500 L/min, or might be not greater than 1000 L/min, or might be not greater than 850 L/min, for example.

Temperature of the compressed gas delivered to kneading chamber 4 might be not less than 15° C., or might be not less than 20° C., or might be not less than 25° C. for example. On the other hand, temperature of the compressed gas might be not greater than 150° C., or might be not greater than 100° C., for example. The reason for this is that if the temperature of the compressed gas were extremely low or extremely high, the compressed gas would have an excessively large effect on the kneading temperature. Note that "the temperature of the compressed gas" might be the temperature of the compressed gas which emerges from an air dryer, for example. What is referred to here as an air dryer might be an air dryer which is incorporated within compressor 21, or might be an air dryer which is provided between compressor 21 and internal kneader 1.

As has already been explained, whereas the rotational speed of rotor 3 is adjusted by means of PID control so as to cause the kneading temperature to be target temperature Ts during Operation K3, this (specifically, control of the rotational speed of rotor 3 by means of PID control) makes it possible to suppress occurrence of gel formation and/or reduction in the degree to which the coupling reaction takes place. Description will be given with respect to this. If a nonpressing state were made to exist with no PID control of rotor 3 being carried out whatsoever (i.e., if a nonpressing state were made to exist while the rotational speed of rotor 3 was held constant), it is conceivable that a given blended mixture might result in a situation in which the kneading temperature is reduced to a temperature below the temperature lower limit for the coupling reaction to proceed, and that another given blended mixture might result in a situation in which the kneading temperature is made to increase to a temperature not less than the temperature at which gel formation occurs. To address this, by controlling the rotational speed of rotor 3 by means of PID control, because it is possible to stabilize the kneading temperature, this makes it possible to suppress occurrence of gel formation and/or reduction in the degree to which the coupling reaction takes place.

Thereafter, where necessary, kneading may be continued to be carried out until a prescribed discharge temperature is reached, drop door 9 may be opened, and the rubber mixture may be discharged.

2.1.4. Miscellaneous

Where necessary, the rubber mixture may be subjected to further kneading for improvement of silica dispersal characteristics and/or reduction in Mooney viscosity. In other words, rekneading thereof may be carried out. Rekneading may be carried out multiple times.

As a result of a procedure such as the foregoing, a rubber mixture may be obtained.

2.2. Operation S2 (Operation in which Rubber Mixture and Vulcanizing-Type Compounding Ingredient are Kneaded to Obtain Rubber Composition)

At Operation S2, at least the rubber mixture and a vulcanizing-type compounding ingredient are kneaded to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. One or any desired combination may be chosen from thereamong and used as the vulcanizing-type compounding ingredient. As examples of the sulfur, powdered sulfur, precipitated sulfur, insoluble sulfur, high dispersing sulfur, and the like may be cited. One or any desired combination may be chosen from thereamong and used as the sulfur. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited. One or any desired combination may be chosen from thereamong and used as the vulcanization accelerator. Kneading may be carried out using a kneader. As the kneader, internal kneaders, open roll mills, and the like may be cited as examples. As an internal kneader, Banbury mixers, kneaders, and the like may be cited as examples.

It is preferred that the amount of silica in the rubber composition be not less than 10 parts by mass, more preferred that this be not less than 30 parts by mass, still more preferred that this be not less than 50 parts by mass, still more preferred that this be not less than 70 parts by mass, and still more preferred that this be not less than 80 parts by mass, per 100 parts by mass of rubber. It is preferred that the amount of silica be not greater than 150 parts by mass, more preferred that this be not greater than 140 parts by mass, still more preferred that this be not greater than 130 parts by mass, and still more preferred that this be not greater than 120 parts by mass, per 100 parts by mass of rubber.

It is preferred that the amount of silane coupling agent in the rubber composition be not less than 1 part by mass, more preferred that this be not less than 3 parts by mass, and still more preferred that this be not less than 5 parts by mass, per 100 parts by mass of silica. The upper limit of the range in values for the amount of silane coupling agent might be 20 parts by mass, or might be 15 parts by mass, per 100 parts by mass of silica, for example.

The rubber composition may further comprise carbon black, antioxidant, stearic acid, wax, zinc oxide, oil, sulfur, vulcanization accelerator, and/or the like. The rubber composition may comprise one or any desired combination thereamong. It is preferred that the amount of the sulfur, expressed as equivalent sulfur content, be 0.5 part by mass to 5 parts by mass for every 100 parts by mass of rubber. It is preferred that the amount of the vulcanization accelerator be 0.1 part by mass to 5 parts by mass for every 100 parts by mass of rubber.

The rubber composition may be used to fabricate a tire. More specifically, it is capable of being used in fabricating tire member(s) making up a tire. For example, the rubber composition may be used in fabricating tread rubber, sidewall rubber, chafer rubber, bead filler rubber, and/or the like. The rubber composition may be used to fabricate one or any desired combination among such tire member(s).

3. Tire Manufacturing Method

Methods for manufacturing tires in accordance with the present embodiment will now be described. Of the operations comprised by the tire manufacturing method of the present embodiment, note that operations for preparing a rubber composition have already been described.

A tire manufacturing method in accordance with the present embodiment comprises an operation in which a rubber composition is used to fabricate an unvulcanized tire. This operation comprises fabrication of tire member(s) which comprise a rubber composition(s), and fabrication of an unvulcanized tire that comprises the tire member(s). As tire member(s), tread rubber, sidewall rubber, chafer rubber, and bead filler rubber may be cited as examples. Thereamong, tread rubber is preferred.

The tire manufacturing method in accordance with the present embodiment may further comprise an operation in which the unvulcanized tire is vulcanized and molded. The tire obtained in accordance with the method of the present embodiment may be a pneumatic tire.

4. Various Modifications May be Made to the Foregoing Embodiment

Various modifications may be made to the foregoing embodiment. For example, modifications which may be made to the foregoing embodiment might include any one or more variations chosen from among the following.

The foregoing embodiment was described in terms of a constitution in which the total amount of silica is fed thereinto during a kneading stage comprising Operations K1 through K3. However, the foregoing embodiment is not limited to this constitution. For example, feeding of silica thereinto may be divided among a plurality of kneading stages.

The foregoing embodiment was described in terms of a constitution in which the rubber composition manufacturing method comprises Operation K1. However, the foregoing embodiment is not limited to this constitution. That is, the rubber composition manufacturing method need not comprise Operation K1. In such case, at least rubber, silica, and silane coupling agent might be fed into internal kneader 1, these might be kneaded without carrying out temperature control, and temperature control (i.e., control such as will cause the kneading temperature to be not less than the temperature lower limit for the coupling reaction to proceed) might be made to begin at a prescribed timing, for example.

The foregoing embodiment was described in terms of a constitution in which control of kneading temperature is carried out by means of the rotational speed of rotor 3 at Operation K1. However, the foregoing embodiment is not limited to this constitution. For example, control of kneading temperature may be carried out by means of the temperature of a heating/cooling medium that flows through a jacket (not shown) at internal kneader 1.

The foregoing embodiment was described in terms of a constitution in which control of kneading temperature is carried out based on PID control at Operation K1. However, the foregoing embodiment is not limited to this constitution. Control of kneading temperature may be carried out based on a control method other than PID control.

The foregoing embodiment was described in terms of a constitution in which a volatile substance discharge state (i.e., a state in which ram 7 is in a nonpressing state and in which compressed gas is being delivered to kneading chamber 4) is created at Operation K3 (i.e., an operation in which kneading is carried out at internal kneader 1 while kneading temperature is controlled so as to be not less than the temperature lower limit for the coupling reaction to proceed). However, the foregoing embodiment is not limited to this constitution. For example, a volatile substance discharge state might be created at a time when kneading is carried out without control of kneading temperature at a temperature not less than the temperature lower limit for the coupling reaction to proceed.

The foregoing embodiment was described in terms of a constitution in which control of kneading temperature is carried out by means of the rotational speed of rotor 3 at Operation K3. However, the foregoing embodiment is not limited to this constitution. For example, control of kneading temperature may be carried out by means of the temperature of a heating/cooling medium that flows through a jacket (not shown) at internal kneader 1.

The foregoing embodiment was described in terms of a constitution in which control of kneading temperature is carried out based on PID control at Operation K3. However, the foregoing embodiment is not limited to this constitution. Control of kneading temperature may be carried out based on a control method other than PI) control.

The foregoing embodiment was described in terms of a constitution in which hopper door 6a is opened for the purpose of creating a nonpressing state. However, the foregoing embodiment is not limited to this constitution. For example, instead of opening hopper door 6a, some sort of hole provided at internal kneader 1 might be opened. As such a hole, a hole allowing oil to be injected into kneading chamber 4 may be cited as an example. Because inlet port 6 which is opened and closed by hopper door 6a will typically be larger than a hole for injection of oil, opening of hopper door 6a will lead to efficient discharge of volatile substances. Opening of hopper door 6a is therefore preferred.

The foregoing embodiment was described in terms of a constitution in which compressed gas is delivered to kneading chamber 4 by way of a hole constituting an opening in a wall face of kneading chamber 4. However, the foregoing embodiment is not limited to this constitution. For example, plumbing capable of causing compressed gas generated at compressor 21 to be expelled therefrom might be inserted thereinto by way of inlet port 6 so as to be directed toward kneading chamber 4, and compressed gas might be thereafter be delivered to kneading chamber 4 by way of that plumbing.

The foregoing embodiment was described in terms of a constitution in which a rubber mixture and a vulcanizing-type compounding ingredient are kneaded to obtain a rubber composition. However, the foregoing embodiment is not limited to this constitution. For example, the rubber mixture may be deemed to be the rubber composition.

WORKING EXAMPLES

Working examples in accordance with the present invention are described below.

Working Examples 1-6 and Comparative Examples 1-5

The raw materials and reagents that were used at these Examples are indicated below.

| | |
|---|---|
| SBR | "SBR 1502" manufactured by JSR Corporation |
| Modified solution polymerization SBR | "HPR 350" manufactured by JSR Corporation |
| Silica | "Nipsil AQ" manufactured by Tosoh Silica Corporation |
| Silane coupling agent | "Si 75" manufactured by Degussa |
| Stearic acid | "LUNAC S-20" manufactured by Kao Corporation |
| Carbon black | "N339 SEAST KH" manufactured by Tokai Carbon Co., Ltd. |
| Oil | "Process NC140" manufactured by JX Nippon Oil |
| Zinc oxide | "Zinc Oxide No. 1" manufactured by Mitsui Mining & Smelting Co., Ltd. |
| Antioxidant | "Antigen 6C" manufactured by manufactured by Sumitomo Chemical Co., Ltd. |
| Sulfur | "5% Oil Treated Sulfur" manufactured by Tsurumi Chemical Industry Co., Ltd. |
| Vulcanization Accelerator 1 | "Sanceler DM-G" manufactured by Sanshin Chemical Industry Co., Ltd. |
| Vulcanization Accelerator 2 | "Soxinol CZ" manufactured by Sumitomo Chemical Co., Ltd. |

TABLE 1

| | | First kneading stage | Final stage |
|---|---|---|---|
| Blended amount parts by mass | SBR | 50.0 | — |
| | Modified solution polymerization SBR | 50.0 | — |
| | Silica | 100.0 | — |
| | Silane coupling agent | 9.0 | — |
| | Stearic acid | 2.0 | — |
| | Carbon black | 5.0 | — |
| | Oil | 32.0 | — |
| | Zinc oxide | 2.0 | — |
| | Antioxidant | 2.0 | — |
| | Sulfur | — | 2.1 |
| | Vulcanization Accelerator 1 | — | 2.2 |
| | Vulcanization Accelerator 2 | — | 1.7 |

Preparation of Unvulcanized Rubber at Comparative Example 1 Rubber and compounding ingredients in accordance with TABLE 1 were fed into a Banbury mixer, were kneaded without carrying out PID control, and the mixture was discharged therefrom at 160° C. (first kneading stage). During the first kneading stage, kneading was carried out while in a state in which a downward force was exerted thereon by the ram; i.e., while this is in a pressing state. The mixture obtained at the first kneading stage was rekneaded in the Banbury mixer without carrying out PID control, and this was discharged therefrom at 160° C. (second kneading stage). The mixture obtained at the second kneading stage was rekneaded in the Banbury mixer without carrying out PID control, and this was discharged therefrom at 160° C. (third kneading stage). The mixture obtained at the third kneading stage and sulfur and vulcanization accelerator were kneaded to obtain unvulcanized rubber (final stage).

Preparation of Unvulcanized Rubber at Comparative Example 2 Rubber and compounding ingredients in accordance with TABLE 1 were fed into a Banbury mixer, were kneaded while PID control was carried out (specifically. PID control in which the control start temperature was 150° C. the target temperature was 150° C., and the control time was 180 seconds), and the mixture was discharged therefrom at 160° C. (first kneading stage). During the first kneading stage, kneading was carried out while in a state in which a downward force was exerted thereon by the ram; i.e., while this is in a pressing state. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Comparative Example 3 Rubber and compounding ingredients in accordance with TABLE 1 were fed into a Banbury mixer, were kneaded while PID control was carried out (specifically, PID control consisting of a first PID control in which the control start temperature was 130° C., the target temperature was 130° C., and the control time was 40 seconds, and a second PID control in which the control start temperature was 150° C., the target temperature was 150° C., and the control time was 140 seconds), and the mixture was discharged therefrom at 160° C. (first kneading stage). During the first kneading stage, kneading was carried out while in a state in which a downward force was exerted thereon by the ram; i.e., while this is in a pressing state. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Comparative Example 4

Rubber and compounding ingredients in accordance with TABLE 1 were fed into a Banbury mixer, were kneaded while PID control was carried out (specifically. PID control in which the control start temperature was 150° C. the target temperature was 150° C., and the control time was 180 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 180-second control time during the first kneading stage. At this time, the hopper door was opened and the ram was raised after 65 seconds had elapsed following the start of PID control. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 1

Rubber and compounding ingredients in accordance with TABLE 1 were fed into a Banbury mixer, were kneaded while PHD control was carried out (specifically. PID control in which the control start temperature was 150° C., the target temperature was 150° C., and the control time was 180 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 180-second control time during the first kneading stage. At this time, the hopper door was opened and the ram was raised after 65 seconds had elapsed following the start of PID control. In addition, during that 50-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 2

Rubber and compounding ingredients in accordance with TABLE 1 were fed into a Banbury mixer, were kneaded while PID control was carried out (specifically, PID control in which the control start temperature was 150° C., the target temperature was 150° C. and the control time was 180 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 80 seconds of the middle phase of the 180-second control time during the first kneading stage. At this time, the hopper door was opened and the ram was raised after 50 seconds had elapsed following the start of PID control. In addition, during that 80-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 3

Rubber and compounding ingredients in accordance with TABLE 1 were fed into a Banbury mixer, were kneaded while PID control was carried out (specifically, PID control in which the control start temperature was 150° C., the target temperature was 150° C. and the control time was 180 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 100 seconds of the middle phase of the 180-second control time during the first kneading stage. At this time, the hopper door was opened and the ram was raised after 40 seconds had elapsed following the start of PID control. In addition, during that 100-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Comparative Example 5

Rubber and compounding ingredients in accordance with TABLE 1 were fed into a Banbury mixer, were kneaded while PID control was carried out (specifically, PID control consisting of a first PID control in which the control start temperature was 130° C., the target temperature was 130° C., and the control time was 40 seconds; and a second PID control in which the control start temperature was 150° C., the target temperature was 150° C., and the control time was 140 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 140-second control time at the second PID control during the first kneading stage. At this time, the hopper door was opened and the ram was raised after 45 seconds had elapsed following the start of the second PID control. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 4

Rubber and compounding ingredients in accordance with TABLE 1 were fed into a Banbury mixer, were kneaded while PID control was carried out (specifically. PID control consisting of a first PID control in which the control start temperature was 130° C., the target temperature was 130° C., and the control time was 40 seconds; and a second PID control in which the control start temperature was 150° C., the target temperature was 150° C., and the control time was 140 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 140-second control time at the second PID control during the first kneading stage. At this time, the hopper door was opened and the ram was raised after 45 seconds had elapsed following the start of the second PID control. In addition, during that 50-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 5

Rubber and compounding ingredients in accordance with TABLE 1 were fed into a Banbury mixer, were kneaded while PID control was carried out (specifically, PID control consisting of a first PID control in which the control start temperature was 130° C., the target temperature was 130° C., and the control time was 40 seconds; and a second PID control in which the control start temperature was 150° C., the target temperature was 150° C. and the control time was 140 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 80 seconds of the middle phase of the 140-second control time at the second PID control during the first kneading stage. At this time, the hopper door was opened and the ram was raised after 30 seconds had elapsed following the start of the second PID control. In addition, during that 80-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 6

Rubber and compounding ingredients in accordance with TABLE 1 were fed into a Banbury mixer, were kneaded while PID control was carried out (specifically, PID control consisting of a first PID control in which the control start temperature was 130° C., the target temperature was 130° C. and the control time was 40 seconds; and a second PID control in which the control start temperature was 150° C., the target temperature was 150° C. and the control time was 140 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 100 seconds of the middle phase of the 140-second control time at the second PID control during the first kneading stage. At this time, the hopper door was opened and the ram was raised after 20 seconds had elapsed following the start of the second PID control. In addition, during that 100-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Vulcanized Rubber

The unvulcanized rubber was vulcanized for 30 minutes at 150° C. to obtain vulcanized rubber.

Mooney Viscosity

A rotorless Mooney measurement apparatus manufactured by Toyo Seiki Seisaku-sho, Ltd., was used to measure Mooney viscosity of the unvulcanized rubber in accordance with JIS K-6300. To measure Mooney viscosity, unvulcanized rubber was preheated at 100° C. for 1 minute, following which the rotor was made to rotate, the value of the torque 4 minutes after the start of rotation of the rotor being recorded in Mooney units. The Mooney viscosities of the respective Examples are shown at TABLE 2 as indexed relative to a value of 100 for the Mooney viscosity obtained at Comparative Example 1. The smaller the index the lower the Mooney viscosity and the better the workability.

Wear Resistance

The amount of wear of the vulcanized rubber was measured in accordance with JIS K6264 using a Lambourn abrasion tester with a load of 3 kg and a slip ratio of 20% at a temperature of 23° C. The reciprocals (reciprocals of amounts of wear) for the respective Examples are shown at TABLE 2 as indexed relative to a value of 100 for the reciprocal of the amount of wear obtained at Comparative Example 1. The higher the index the better the wear resistance.

Wet Braking Performance

A Rüpke rebound resilience testing apparatus was used to measure rebound resilience (%) under conditions of 23° C. in accordance with JIS K6255. The reciprocals (reciprocals of rebound resiliences) for the respective Examples are shown at TABLE 2 as indexed relative to a value of 100 for the reciprocal of the rebound resilience obtained at Comparative Example 1. The higher the index the better the wet braking performance.

Ability to Achieve Reduced Fuel Consumption

A viscoelasticity testing machine manufactured by Toyo Seiki Seisaku-sho, Ltd., was used to measure tan δ of the vulcanized rubber in accordance with JIS K-6394. tan δ was measured under conditions of frequency 10 Hz, dynamic strain 1.0%, temperature 60° C., and static strain (initial strain) 10%. tan δ of the respective Examples are shown at TABLE 2 as indexed relative to a value of 100 for the tan δ obtained at Comparative Example 1. The smaller the index the lower the tan δ and the better the ability to achieve reduced fuel consumption.

TABLE 2

| | | Comparative Example 1 | Comparative Example 2 | Comparative Example 3 | Comparative Example 4 | Working Example 1 | Working Example 2 |
|---|---|---|---|---|---|---|---|
| First kneading stage | Target temperature at first PID control ° C. | — | — | 130 | — | — | — |
| | Target temperature at second PID control ° C. | — | 150 | 150 | 150 | 150 | 150 |
| | Control time at first PID control seconds | — | — | 40 | — | — | — |
| | Control time at second PID control seconds | — | 180 | 140 | 180 | 180 | 180 |
| | Time during which in nonpressing state seconds | — | — | — | 50 | 50 | 80 |
| | Injection of compressed air | No | No | No | No | Yes | Yes |
| | Discharge temperature ° C. | 160 | 160 | 160 | 160 | 160 | 160 |
| | Second kneading stage (rekneading) | Yes | Yes | Yes | Yes | Yes | Yes |
| | Third kneading stage (rekneading) | Yes | No | No | No | No | No |
| Evaluation | Mooney viscosity | 100 | 99 | 90 | 98 | 96 | 96 |
| | Wear resistance | 100 | 101 | 104 | 103 | 110 | 115 |
| | Wet braking performance | 100 | 101 | 105 | 103 | 105 | 106 |
| | Ability to achieve reduced fuel consumption | 100 | 98 | 88 | 96 | 94 | 93 |

| | | Working Example 3 | Comparative Example 5 | Working Example 4 | Working Example 5 | Working Example 6 |
|---|---|---|---|---|---|---|
| First kneading stage | Target temperature at first PID control ° C. | — | 130 | 130 | 130 | 130 |
| | Target temperature at second PID control ° C. | 150 | 150 | 150 | 150 | 150 |
| | Control time at first PID control seconds | — | 40 | 40 | 40 | 40 |
| | Control time at second PID control seconds | 180 | 140 | 140 | 140 | 140 |
| | Time during which in nonpressing state seconds | 100 | 50 | 50 | 80 | 100 |
| | Injection of compressed air | Yes | No | Yes | Yes | Yes |
| | Discharge temperature ° C. | 160 | 160 | 160 | 160 | 160 |

TABLE 2-continued

| | | | | | | |
|---|---|---|---|---|---|---|
| | Second kneading stage (rekneading) | Yes | Yes | Yes | Yes | Yes |
| | Third kneading stage (rekneading) | No | No | No | No | No |
| Evaluation | Mooney viscosity | 97 | 89 | 89 | 88 | 86 |
| | Wear resistance | 121 | 106 | 115 | 123 | 130 |
| | Wet braking performance | 108 | 107 | 109 | 109 | 111 |
| | Ability to achieve reduced fuel consumption | 91 | 83 | 81 | 80 | 79 |

At TABLE 2, rotational speed of the rotor was controlled during the PID control which was carried out at the first kneading stage.

Where "injection of compressed air" appears at TABLE 2, this refers to delivery of compressed air at 0.5 MPa and an expulsion rate of 800 L/min into the kneading chamber by way of a hole constituting an opening in a wall face of the kneading chamber of the Banbury mixer. Note that this pressure is the value that was measured at a pressure gauge present at an air hose attached to the Banbury mixer. It should incidentally be noted that although the temperature of the compressed air was not measured, it is thought that this would have been a temperature in the vicinity of normal temperature.

Note that because the silane coupling agent ("Si 75" manufactured by Degussa) was such that whereas reaction with silica barely proceeded at all at 130° C. reaction with silica did proceed at 150° C., 130° C. was below the temperature lower limit for the coupling reaction to proceed, while 150° C. was above the temperature lower limit for the coupling reaction to proceed.

Where compressed air was injected thereinto while this is in a nonpressing state (specifically, a state in which the ram was raised and the inlet port of the Banbury mixer was open) during kneading while carrying out PID control in which the target temperature was 150° C., it was possible to improve wear resistance, wet braking performance, and ability to achieve reduced fuel consumption as compared with the situation in which compressed air was not injected thereinto (see Comparative Example 4 and Working Examples 1-3; see Comparative Example 5 and Working Examples 4-6). In addition, it was also possible to improve Mooney viscosity.

Working Examples 7 and 8, and Comparative Examples 6 and 7

The raw materials and reagents that were used at these Examples are indicated below.

| | |
|---|---|
| NR | RSS #3 |
| SBR | "SBR 1502" manufactured by JSR Corporation |
| S-SBR | "Tuf 1834" manufactured by Asahi Kasei Corporation |
| Silica | "Nipsil AQ" manufactured by Tosoh Silica Corporation |
| Silane coupling agent | "Si 75" manufactured by Degussa |
| Stearic acid | "LUNAC S-20" manufactured by Kao Corporation |
| Carbon black | "N339 SEAST KH" manufactured by Tokai Carbon Co., Ltd. |
| Oil | "Process NC140" manufactured by JX Nippon Oil |
| Zinc oxide | "Zinc Oxide No. 1" manufactured by Mitsui Mining & Smelting Co., Ltd. |
| Antioxidant | "Antigen 6C" manufactured by manufactured by Sumitomo Chemical Co., Ltd. |
| Sulfur | "5% Oil Treated Sulfur" manufactured by Tsurumi Chemical Industry Co., Ltd. |
| Vulcanization Accelerator 1 | "Sanceler DM-G" manufactured by Sanshin Chemical Industry Co., Ltd. |
| Vulcanization Accelerator 2 | "Soxinol CZ" manufactured by Sumitomo Chemical Co., Ltd. |

TABLE 3

| | | First kneading stage | Final stage |
|---|---|---|---|
| Blended amount parts by mass | NR | 20.0 | — |
| | SBR | 40.0 | — |
| | S-SBR | 40.0 | — |
| | Silica | 75.0 | — |
| | Silane coupling agent | 7.0 | — |
| | Stearic acid | 3.0 | — |
| | Carbon black | 10.0 | — |
| | Oil | 25.0 | — |
| | Zinc oxide | 2.0 | — |
| | Antioxidant | 2.0 | — |
| | Sulfur | — | 2.5 |
| | Vulcanization Accelerator 1 | — | 2.0 |
| | Vulcanization Accelerator 2 | — | 1.5 |

Preparation of Unvulcanized Rubber at Comparative Example 6

Rubber and compounding ingredients in accordance with TABLE 3 were fed into a Banbury mixer, were kneaded while PID control was carried out (specifically. PID control in which the control start temperature was 150° C., the target temperature was 150° C., and the control time was 180 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 180-second control time during the first kneading stage. At this time, the hopper door was opened and the ram was raised after 65 seconds had elapsed following the start of PID control. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 7

Rubber and compounding ingredients in accordance with TABLE 3 were fed into a Banbury mixer, were kneaded while PID control was carried out (specifically, PID control in which the control start temperature was 150° C., the target temperature was 150° C. and the control time was 180 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 180-second control time during the first kneading stage. At this time, the hopper door was opened and the ram was raised after 65 seconds had elapsed following the start of PID control. In addition, during that 50-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Comparative Example 7

Rubber and compounding ingredients in accordance with TABLE 3 were fed into a Banbury mixer, were kneaded while PID control was carried out (specifically, PID control consisting of a first PID control in which the control start temperature was 130° C., the target temperature was 130° C., and the control time was 40 seconds; and a second PID control in which the control start temperature was 150° C., the target temperature was 150° C. and the control time was 140 seconds), and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 140-second control time at the second PID control during the first kneading stage. At this time, the hopper door was opened and the ram was raised after 45 seconds had elapsed following the start of the second PID control. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Unvulcanized Rubber at Working Example 8

Rubber and compounding ingredients in accordance with TABLE 3 were fed into a Banbury mixer, were kneaded while PID control was carried out (specifically, PID control consisting of a first PID control in which the control start temperature was 130° C., the target temperature was 130° C. and the control time was 40 seconds; and a second PID control in which the control start temperature was 150° C., the target temperature was 150° C., and the control time was 140 seconds, and the mixture was discharged therefrom at 160° C. (first kneading stage). The hopper door for the purpose of blocking off the inlet port of the Banbury mixer was opened, and kneading was carried out with the ram in a state in which it was raised to a height higher than the inlet port, for only 50 seconds of the middle phase of the 140-second control time at the second PID control during the first kneading stage. At this time, the hopper door was opened and the ram was raised after 45 seconds had elapsed following the start of the second PID control. In addition, during that 50-second period, compressed air generated by a compressor was delivered thereto by way of a hole formed in a wall face of kneading chamber. The mixture obtained at the first kneading stage was rekneaded in the Banbury mixer without carrying out PID control, and this was discharged therefrom at 160° C. (second kneading stage). Following rekneading, the mixture and sulfur and vulcanization accelerator were kneaded to obtain unvulcanized rubber (final stage).

Preparation of Vulcanized Rubber

The unvulcanized rubber was vulcanized for 30 minutes at 150° C. to obtain vulcanized rubber.

Evaluation

Mooney viscosity, wear resistance, wet braking performance, and ability to achieve reduced fuel consumption were measured in accordance with the foregoing methods. Mooney viscosities of the respective Examples are shown at TABLE 4 as indexed relative to a value of 100 for the Mooney viscosity obtained at Comparative Example 6. The smaller the index the lower the Mooney viscosity and the better the workability. Regarding wear resistance, the reciprocals of the amounts of wear for the respective Examples are shown at TABLE 4 as indexed relative to a value of 100 for the reciprocal of the amount of wear obtained at Comparative Example 6. The higher the index the better the wear resistance. Regarding wet braking performance, the reciprocals of the rebound resiliences for the respective Examples are shown at TABLE 4 as indexed relative to a value of 100 for the reciprocal of the rebound resilience obtained at Comparative Example 6. The higher the index the better the wet braking performance. tan δ of the respective Examples are shown at TABLE 4 as indexed relative to a value of 100 for the tan δ of Comparative Example 6. The smaller the index the lower the tan δ and the better the ability to achieve reduced fuel consumption.

TABLE 4

| | | Comparative Example 6 | Working Example 7 | Comparative Example 7 | Working Example 8 |
|---|---|---|---|---|---|
| First kneading stage | Target temperature at first PID control ° C. | — | — | 130 | 130 |
| | Target temperature at second PID control ° C. | 150 | 150 | 150 | 150 |
| | Control time at first PID control seconds | — | — | 40 | 40 |
| | Control time at second PID control seconds | 180 | 180 | 140 | 140 |
| | Time during which in nonpressing state seconds | 50 | 50 | 50 | 50 |
| | Injection of compressed air | No | Yes | No | Yes |
| | Discharge temperature ° C. | 160 | 160 | 160 | 160 |
| | Second kneading stage (rekneading) | Yes | Yes | Yes | Yes |
| Evaluation | Mooney viscosity | 100 | 98 | 94 | 93 |
| | Wear resistance | 100 | 106 | 103 | 110 |
| | Wet braking performance | 100 | 103 | 104 | 106 |
| | Ability to achieve reduced fuel consumption | 100 | 98 | 92 | 90 |

At TABLE 4 as well, rotational speed of the rotor was controlled during the PID control which was carried out at the first kneading stage.

Where "injection of compressed air" appears at TABLE 4 as well, this refers to delivery of compressed air at 0.5 MPa and an expulsion rate of 800 L/min into the kneading chamber by way of a hole constituting an opening in a wall face of the kneading chamber of the Banbury mixer. Note that this pressure as well is the value that was measured at a pressure gauge present at an air hose attached to the Banbury mixer. It should incidentally be noted that although the temperature of the compressed air was not measured, it is thought that this would have been a temperature in the vicinity of normal temperature.

Where compressed air was injected thereinto while this is in a nonpressing state (specifically, a state in which the ram was raised and the inlet port of the Banbury mixer was open) during kneading while carrying out PID control in which the target temperature was 150° C., it was possible to improve wear resistance, wet braking performance, and ability to achieve reduced fuel consumption as compared with the situation in which compressed air was not injected thereinto (see Comparative Example 6 and Working Example 7; see Comparative Example 7 and Working Example 8). In addition, it was also possible to improve Mooney viscosity.

EXPLANATION OF REFERENCE NUMERALS

1 . . . internal kneader; 2 . . . casing; 2a . . . opening; 3 . . . rotor; 4 . . . kneading chamber; 5 . . . neck; 6 . . . inlet port; 6a . . . hopper door; 7 . . . ram; 8 . . . shaft; 9 . . . drop door; 11 . . . controller; 13 . . . temperature sensor; 21 . . . compressor; 25 . . . housing; 26 . . . plumbing; 30 . . . rubber composition manufacturing apparatus

The invention claimed is:

1. A rubber composition manufacturing method comprising; a first operation in which at least rubber, silica, and silane coupling agent are kneaded in an internal kneader while kneading temperature is controlled so as to be below a temperature lower limit for a coupling reaction between the silica and the silane coupling agent to proceed; and a second operation in which at least the rubber, the silica, and the silane coupling agent are kneaded in the internal kneader at not less than the temperature lower limit for the coupling reaction between the silica and the silane coupling agent to proceed, wherein
the internal kneader comprises a kneading chamber, a neck which is located above the kneading chamber, and a ram which is capable of moving vertically through a space within the neck;
for at least a portion of time during which the second operation is being carried out, a compressed gas is delivered to the kneading chamber while the ram is in a nonpressing state;
the internal kneader comprises a rotor at the kneading chamber;
in the first operation, rotational speed of the rotor is controlled by means of proportional integral differential control to cause the kneading temperature to be a first target temperature;
the first target temperature is less than 140° C.;
for the at least the portion of the time during which the second operation is being carried out, rotational speed of the rotor is controlled by means of proportional integral differential control to cause the kneading temperature to be a second target temperature; and
the second target temperature is not less than 140° C.

2. The rubber composition manufacturing method according to claim 1 wherein the at least the portion of the time is not less than 5 seconds.

3. The rubber composition manufacturing method according to claim 1 wherein
the internal kneader further comprises a hole constituting an opening in a wall face of the kneading chamber; and
for the at least the portion of the time, the compressed gas is delivered to the kneading chamber by way of the hole.

4. The rubber composition manufacturing method according to claim 1 wherein the compressed gas is compressed air.

5. The rubber composition manufacturing method according to claim 1 wherein
the internal kneader further comprises an inlet port which is provided at the neck, and
a hopper door which is capable of opening and closing the inlet port; and
for the at least the portion of the time, the hopper door is open.

6. The rubber composition manufacturing method according to claim 1 wherein, during the first operation, the silica is present in an amount that is not less than 10 parts by mass but not greater than 150 parts by mass per 100 parts by mass of the rubber.

7. The rubber composition manufacturing method according to claim 1 wherein, during the first operation, the silane coupling agent is present in an amount that is not less than 1 part by mass but not greater than 20 parts by mass per 100 parts by mass of the silica.

8. The rubber composition manufacturing method according to claim 1 wherein, during the first operation, at least carbon black is kneaded together with the rubber, the silica, and the silane coupling agent.

9. The rubber composition manufacturing method according to claim 1 wherein, during the first operation antioxidant is kneaded together with the rubber, the silica, and the silane coupling agent.

10. The rubber composition manufacturing method according to claim 1 wherein the at least the portion of the time is not less than 20 seconds.

11. A tire manufacturing method comprising:
an operation in which the rubber composition manufacturing method according to claim 1 is used to prepare the rubber composition; and
an operation in which the rubber composition is used to fabricate an unvulcanized tire.

12. The tire manufacturing method according to claim 11 wherein the operation in which the unvulcanized tire is fabricated comprises fabrication of a tire member comprising the rubber composition, and fabrication of the unvulcanized tire that comprises the tire member.

13. The rubber composition manufacturing method according to claim 1 wherein the at least the portion of the time is not less than 30 seconds.

14. The rubber composition manufacturing method according to claim 1 wherein the at least the portion of the time is not less than 50 seconds.

15. The rubber composition manufacturing method according to claim 1 wherein the first target temperature is not greater than 135° C.; and the second target temperature is not less than 145° C.

16. The rubber composition manufacturing method according to claim 1 wherein the first target temperature is not less than 120° C. but not greater than 135° C.; and
the second target temperature is not less than 145° C. but not greater than 155° C.

17. The rubber composition manufacturing method according to claim 1 wherein, during the first operation, the silica is present in an amount that is not less than 30 parts by mass but not greater than 150 parts by mass per 100 parts by mass of the rubber.

18. The rubber composition manufacturing method according to claim 1 wherein, during the first operation, the silica is present in an amount that is not less than 50 parts by mass but not greater than 150 parts by mass per 100 parts by mass of the rubber.

19. The rubber composition manufacturing method according to claim 1 wherein, during the first operation, the silica is present in an amount that is not less than 10 parts by mass but not greater than 150 parts by mass per 100 parts by mass of the rubber; during the first operation, the silane coupling agent is present in an amount that is not less than 1 part by mass but not greater than 20 parts by mass per 100 parts by mass of the silica;

the at least the portion of the time is not less than 20 seconds;

the first target temperature is not less than 120° C. but not greater than 135° C.; and the second target temperature is not less than 145° C. but not greater than 155° C.

20. The rubber composition manufacturing method according to claim 19 wherein, during the first operation, the silica is present in an amount that is not less than 50 parts by mass but not greater than 150 parts by mass per 100 parts by mass of the rubber; and the at least the portion of the time is not less than 50 seconds.

\* \* \* \* \*